Aug. 21, 1945.  H. V. HARDING  2,383,124
CONNECTOR
Filed Oct. 13, 1943

INVENTOR
HENRY V. HARDING
BY
*F. T. Hicks*
HIS ATTORNEY

Patented Aug. 21, 1945

2,383,124

UNITED STATES PATENT OFFICE 2,383,124

CONNECTOR

Henry V. Harding, Royal Oak, Mich., assignor to Elox Corporation, a corporation of Michigan Application October 13, 1943, Serial No. 506,119

4 Claims. (Cl. 174—21)

My invention pertains to connectors for receiving and establishing connection with the end of a tubular or pipe-like member.

It is an object of my invention to provide a connector of a simple rugged construction, which will be convenient to use, and which will be reliable and permanent in operation.

It is also an object of my invention to provide a combined fluid flow and electrical connector for clamping and securing the end of a pipe or tubular conductor member and for establishing fluid flow connection and low resistance electrical connection therewith.

It is a further object of my invention to provide an improved connector bolt for use in such a connector for clamping the tubular member and for sealing the connection and providing fluid flow and electrical connection therewith.

Other objects of my invention will become apparent from the following detailed description, taken in conjunction with the accompanying drawing, in which.

Figure 1:
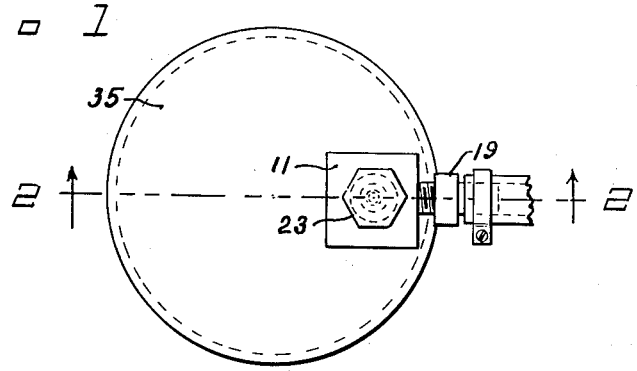
Fig. 1 is a plan view showing my improved connector mounted in the top or end wall of a casing.
Figure 2:
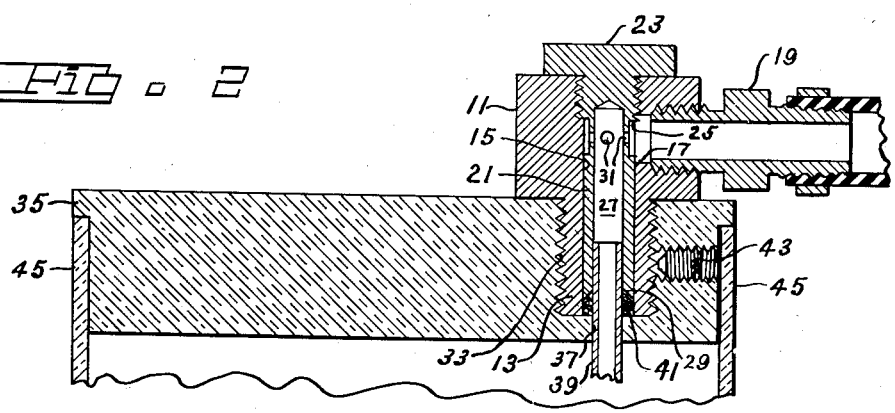
Fig. 2 is a sectional view taken on line 2—2 of Fig. 1 and substantially enlarged.
Figure 3:
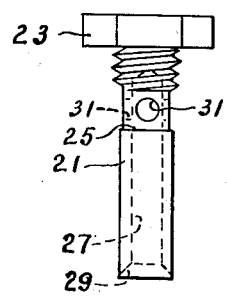
Fig. 3 is a side elevational view showing the connector bolt, per se.

Referring more specifically to the figures of the drawing, my connector comprises a connector block or body 11 having an externally threaded extension 13 projecting from one end and an aperture 15 which extends through the connector block from end-to-end. A port 17 leads from the aperture in the connector block 11 and opens from one side, where it may be internally threaded for receiving a hose connector fitting 19 projecting externally for conveniently receiving a hose for connection with any desired source of fluid to be connected. The aperture in the connector block 11 is internally threaded, preferably in the portion remote from the extension 13, for threadably receiving a connector bolt 21, with the head 23 thereof abutting the end of the connector block remote from the extension portion, and the adjacent portion of the bolt being suitably threaded. The inserted portion of the connector bolt is smaller in diameter than the threaded portion, and it is preferably provided with a circumferential groove 25 between the threaded portion and the elongated inserted portion and suitably disposed for connecting with the port 17 when the bolt is inserted into the block. A central aperture 27 extends through the bolt and opens from the inserted end. The opening end of the central aperture 27 in the connector bolt is provided with diverging side walls 29 which provides space for receiving packing and suitable surfaces for wedging and clamping the packing. Lateral passages 31 are provided opening from the central aperture 27 into the external groove 25 on the bolt and connecting into the port 17 in the connector block.

In use, the externally threaded extension portion 13 of the connector block 11 is screwed into a suitable aperture 33 provided in any support structure or wall 35, and terminating at a suitable depth in the wall. From the opposite side of the wall an aperture 37 is provided in alignment with the aperture 33 and suitable for receiving the end of a tubular member or pipe 39 which is to be supported and have connections established therefrom. The pipe 39 is inserted a short distance into the central aperture 37 in the support wall 35, which is suitable for receiving the pipe. Packing material 41 is provided around the inserted end of the pipe 39, where it may be conveniently tamped in with a suitable tool or implement (not shown) and then the connector bolt 21 is inserted and screwed snugly into the connector block 11. This wedges the packing 41 against the pipe and the bottom of the aperture 33 for clamping and holding the pipe and forming a sealed fluid tight joint therewith for conducting fluid to flow from the hose through the fixture 19, the port opening 17 in the block 11, thence around the groove 25 and through the lateral passages 31 and the central passage 27 through the bolt and into the pipe or tubular member 39.

The packing material 41 is preferably a metallic packing material, of which many suitable products are available, when the pipe 39 is also to serve as an electrical conductor from which it is also desired to establish a low resistance connection to the connector block 11. From the block 11 electrical connection may be continued conveniently as by means of a conductor provided with a spring clip (not shown) as will be readily understood. Also the wall 35 whereupon the connector block 11 is mounted may preferably be of electrical insulation material. The mounting of the connector block 11 in the end wall 35 may be firmly and permanently locked, as by inserting a set screw 43 into the side, before the side walls 45 of the casing are assembled thereon.

I do not wish to be restricted to the specific structural details, arrangement of parts or circuit connections herein set forth, as various modifications thereof may be effected without departing from the spirit and scope of my invention.

I claim:

1. A connector comprising, a connector block, an externally threaded extension projecting from one end of said block, an aperture extending through said extension and block from end-to-end, a port connecting from said aperture and opening from one side of said block, internal threads in the end of the aperture remote from the extension, a connector bolt adapted to extend into the aperture through the connector block, external threads on said bolt for threadably engaging the threads in said aperture, a circumferential groove on said bolt adjacent the external threads thereon and adapted to connect into said port opening from one side of the block when the bolt is inserted into the block, a head on the end of the threaded portion of the bolt for turning the bolt into the block, a central aperture extending in said bolt and opening from the end which extends into the extended portion of the block, the opening end of the aperture in the bolt having a diverging side wall providing space for receiving packing for wedging and sealing around a pipe inserted into the end of the bolt for connection, and lateral passages opening from the central aperture into said circumferential groove.

2. In combination in a connector, a connector block, an externally threaded extension projecting from one end of said block, an aperture extending through said block and extension, a port connecting from said aperture and opening from said block, a connector bolt extending in the aperture in the connector block and having a head abutting the end of the block remote from the extension, said bolt having an externally threaded portion of larger diameter adjacent the head and a portion of reduced diameter extending in the aperture in the block, a circumferential groove on the bolt between the threaded portion and reduced portion, a central aperture extending in the bolt and opening from the end inserted into the extension of the connector block, the opening end of said central aperture having a diverging side wall providing space for receiving packing for wedging and sealing around a pipe inserted into the central aperture for connection, lateral passage opening from the central aperture in the bolt into the circumferential groove, and the groove being suitably axially disposed on the bolt for fluid flow connection with said port opening from the connection block when the bolt has been inserted into its extreme position into the block.

3. In combination, a pipe to be connected, a support wall from which said pipe is to be supported and connected with various sources of fluid or energy supply, a connector block, an externally threaded extension projecting from one end of said block, an aperture extending through said block and extension from end-to-end, a port connecting from said aperture and opening from said block, internal threads in the end of the aperture remote from the extension, a connector bolt extending in the aperture in the block, said bolt having a head abutting the end of the connector block remote from the extension and a threaded portion adjacent thereto engaging the internal threads in said aperture, said bolt having a suitable elongated portion extending into the block aperture and a circumferential groove between said threaded portion and said elongated portion, a central aperture in said bolt and opening from the inserted end thereof, the opening end of said central aperture having a diverging sidewall providing space for receiving packing for wedging and sealing around said pipe with the pipe inserted into the central aperture in the bolt for connection, an aperture opening into one side of said support wall and extending partially therethrough for receiving said threaded extension of the connector block, an aperture opening from the opposite side of the support wall for passing said pipe snugly into the central aperture in said bolt, and passages opening from the central aperture through the side of the bolt to the block port.

4. In combination, a support wall of electrical insulation material from which a pipe or tubular conductor member is to be supported and connected with a source of fluid and with a source of electrical energy, a connector block, an externally threaded extension projecting from one end of said block, an aperture extending from one side into said wall of a suitable diameter and terminating at a suitable distance in the wall for snugly receiving the externally threaded extension of said connector block, an aperture extending through said block and extension from end-to-end, a port connecting from said aperture and opening from said connector block, internal threads in the end of said aperture remote from the extension, a connector bolt extending in the aperture in the block, said bolt having a head abutting the end of the connector block remote from the extension, said bolt having external threads on the portion engaging the internal threads in said aperture, a central aperture extending in said bolt and opening from the end inserted in said connector block, the opening end of the central aperture in said bolt having a diverging side wall providing space for receiving packing for snugly clamping the end of a pipe inserted therein, a pipe or tubular member to be secured and connected by insertion into the central aperture in said connector bolt, an aperture of a suitable diameter for receiving the pipe to be supported and extending into said wall in alignment with the first mentioned aperture in said wall and from the opposite side of the wall, said pipe being through said last mentioned or second wall aperture into the central aperture in said connector bolt, metallic packing material disposed in the space within said diverging sidewall and around said pipe to snugly clamp the pipe and to form a seal and electrical connection between the bolt and the pipe when the connector bolt is turned snugly into the connector block, and a lateral passage opening from the central aperture in the bolt to said port.

HENRY V. HARDING.